(12) United States Patent
Maturana

(10) Patent No.: US 11,144,039 B2
(45) Date of Patent: Oct. 12, 2021

(54) SYSTEMS AND METHODS FOR CONTROLLING DEVICES BASED ON MAPPING BETWEEN OPERATION TECHNOLOGY DATA AND INFORMATION TECHNOLOGY DATA

(71) Applicant: Rockwell Automation Technologies, Inc., Mayfield Heights, OH (US)

(72) Inventor: Francisco P. Maturana, Lyndhurst, OH (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 144 days.

(21) Appl. No.: 16/137,352

(22) Filed: Sep. 20, 2018

(65) Prior Publication Data

US 2020/0096976 A1  Mar. 26, 2020

(51) Int. Cl.
*G05B 19/418* (2006.01)
*H04L 29/08* (2006.01)

(52) U.S. Cl.
CPC ............. *G05B 19/41865* (2013.01); *G05B 2219/31229* (2013.01); *H04L 67/12* (2013.01)

(58) Field of Classification Search
CPC .............................................. G05B 19/41865
USPC ................................................... 700/28
See application file for complete search history.

(56) References Cited

U.S. PATENT DOCUMENTS

| | | | |
|---|---|---|---|
| 2015/0199508 A1* | 7/2015 | Matsubara | G06F 9/542 726/22 |
| 2015/0317594 A1* | 11/2015 | Reznik | G06Q 10/06314 705/7.15 |
| 2016/0124742 A1* | 5/2016 | Rangasamy | G06F 9/5072 717/103 |
| 2017/0160880 A1* | 6/2017 | Jose | G06F 8/34 |
| 2018/0089011 A1* | 3/2018 | Basiri | G06F 9/5077 |
| 2018/0234489 A1* | 8/2018 | Hammons | H04L 67/02 |
| 2018/0284975 A1* | 10/2018 | Carrier | G06F 9/451 |
| 2019/0182309 A1* | 6/2019 | Koszek | H04L 69/329 |
| 2019/0207954 A1* | 7/2019 | Ahuja | H04L 63/0236 |

* cited by examiner

*Primary Examiner* — Robert A Cassity

(57) ABSTRACT

A system may include a data delivery pipeline communicatively coupled to one or more microservices that receive a dataset transmitted through the data delivery pipeline. The system may also include a first microservice that receives a first dataset corresponding to operation technology (OT) data or information technology (IT) data and determines a second dataset based on the first dataset. The system may also include a second microservice that receives the second dataset from the first microservice via the data delivery pipeline, determines an action to perform in an industrial automation component of an industrial automation system based on an analysis of the second dataset, and transmits the action to the industrial automation component via the data delivery pipeline.

20 Claims, 7 Drawing Sheets

SYSTEMS AND METHODS FOR CONTROLLING DEVICES BASED ON MAPPING BETWEEN OPERATION TECHNOLOGY DATA AND INFORMATION TECHNOLOGY DATA

BACKGROUND

This disclosure relates generally to systems and methods for automatically mapping data from operation technology (OT) in an industrial automation system to corresponding data stores within an information technology (IT) space. More particularly, embodiments of the present disclosure are related to systems and methods for leveraging microservices in an OT to IT mapping system to automatically associate OT data with IT data.

Industrial automation systems are managed and operated using automation control and monitoring systems, particularly in industrial automation environments. Such applications may include controlling a wide range of components, such as valves, electric motors, and so forth, and the collection of data via sensors. Typical automation control and monitoring systems may include one or more components, such as programming terminals, automation controllers, input/output (I/O) modules, communication networks, human-machine interface (HMI) terminals, and the like.

Generally, certain precautions are taken to ensure that devices in industrial automation systems are operated as desired. However, some industrial automation systems are limited in controlling its devices using the automation control and monitoring systems described above. Although these automation control and monitoring systems may be used to manage the operations of the devices within the industrial automation system, improved systems and methods for operating devices within an industrial automation system are desirable. For example, innovation is bringing new technologies and methods to control and monitor industrial automation systems to the market. However, legacy systems within these industrial automation systems may be difficult to integrate into newer systems, such as systems operating within the internet-of-things (JOT) context. Since many of these legacy systems are based on point-to-point data transmission techniques to connect devices within the industrial automation system to devices within an enterprise computing network, it is desirable to provide more efficient ways to communicatively link the device of the industrial automation system to the device within the enterprise computing network.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system may include a data delivery pipeline communicatively coupled to one or more microservices that receive a dataset transmitted through the data delivery pipeline. A first microservice may receive a first dataset corresponding to operation technology (OT) data or information technology (IT) data, may determine a second dataset based on the first dataset, and may send the second dataset to a second microservice via the data delivery pipeline. A second microservice may determine an action to perform in an industrial automation component of an industrial automation system based on an analysis of the second dataset, and may transmit the action to the industrial automation component via the data delivery pipeline.

In another embodiment a method for performing industrial automation control is described. The method may include receiving operation technology (OT) data at a first microservice from an industrial automation component of an industrial automation system and transmitting the OT data to an information technology (IT) device. The first microservice may identify the IT device based at least in part on a first analysis of the OT data. The method may also include receiving an action from the IT device based on a second analysis of the OT data performed by the IT device, where the IT device may store the OT data, and sending the action to the industrial automation component, where the industrial automation component may adjust one or more operations based on the action.

In yet another embodiment, an additional method for performing industrial automation control is described. The method may include receiving information technology (IT) data at a first microservice from an IT device communicatively coupled to one or more IT components within an IT network and transmitting the IT data to a second microservice through a data delivery pipeline, where the data delivery pipeline may include a data channel identified by the first microservice based on one or more properties of the IT data. The method may include determining, at the second microservice, an action for an industrial automation device of an industrial automation system based on the IT data and transmitting, via the second microservice, the action to the industrial automation device, where the action may cause the industrial automation device to adjust one or more operations.

DRAWINGS

These and other features, aspects, and advantages of the present embodiments will become better understood when the following detailed description is read with reference to the accompanying drawings in which like characters represent like parts throughout the drawings, wherein.

DETAILED DESCRIPTION

Figure 1:
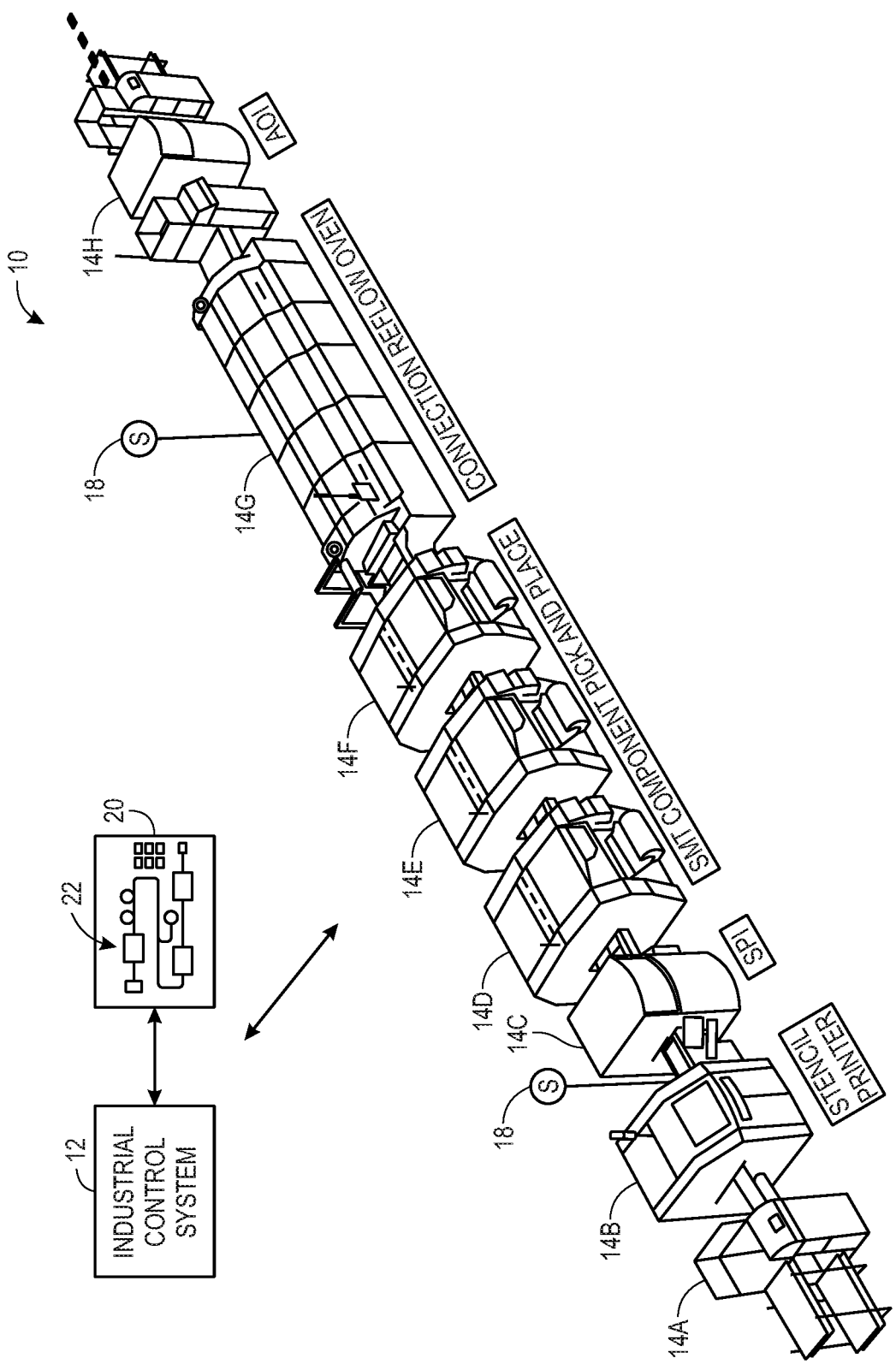
FIG. 1 is a perspective view of an example industrial automation system, in accordance with an embodiment.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

The present disclosure is generally directed towards an operation technology (OT)/information technology (IT) mapping system that dynamically maps data between an OT network device (e.g., a factory device associated with an OT machine) and an IT network device (e.g., an enterprise computing system) during runtime without using pre-defined mappings generated before runtime by a user. This dynamic mapping may enable automatic sorting of OT data, acquired via an industrial automation system, to an IT network without sorting or transferring the OT data according to a pre-defined point-to-point mapping that links the gathered OT data to a particular location within the IT network.

The OT/IT mapping system may include a system that integrates and/or correlates operational-level information with enterprise-level information. Data associated with machine operation in an industrial automation space may be generated at a high-volume. Each device in an industrial automation space may generate data of different formats at different speeds and/or at different volumes. Furthermore, seamless computation and data-enrichment tools are practically non-existent for industrial data applications. This may translate into industrial data gathering applications being plagued by lack of common methodologies, inconsistent data preparation techniques, and disparities between data generated. In short, industrial automation data collection and analysis may be complicated by data being gathered and transmitted in non-standardized formats. The OT/IT mapping system may leverage standardized analysis and loose communicative couplings between analytical systems and storage locations to facilitate classification and segmentation of received data.

In this way, the OT/IT mapping system may be used to associate events or data from an OT network (e.g., manufacturing events, production events, changes in machine operation, statuses, sensor data, alarms) to events or data from an IT network (e.g., request maintenance, changes in production scheduling, prioritization of manufacturing tasks, transactional data, pricing, customer experience, supply chain, all the information related to maintaining information about the processes), and vice versa. At the enterprise-level, an enterprise computing system may receive a multitude of data (e.g., vendor data, data from a variety of industrial automation systems, data from original equipment manufacturers) from various industrial automation spaces that may or may not be related.

The OT/IT mapping system may also provide multiple degrees of freedom between dynamically connecting the first dataset output by a first network to a second dataset of a second network without pre-defining the one-to-one mapping between the two data locations. Indeed, the first dataset may be continuously routed to different microservices to dynamically determine where the first dataset is to be mapped, processed, or both. In this way, an OT/IT mapping system may facilitate integrating legacy systems into industrial IOT applications through translating received data (e.g., such as, analog data from a legacy OT machine) via common data analytics. The common data analytics may facilitate segmentation of the received data by the OT/IT mapping system for routing and storage within an IT network without using point-to-point communication mappings that define where the received data is to be stored in advance of receipt. Additional details with regard to mapping the between OT data and IT data and performing operations based on the mapping are discussed below with reference to FIGS. 1-7.

By way of introduction, FIG. 1 is a perspective view of an example industrial automation system 10 controlled by an industrial control system 12. The industrial automation system 10 includes stations 14 having machine components and/or machines to conduct a particular function within an automated process, such as silicon wafer manufacturing, as is depicted. The automated process may begin at a station 14A used for loading objects, such as substrates, into the industrial automation system 10 via a conveyor section 16. The conveyor section 16 may transport the objects to a station 14B to perform a first action, such a printing solder paste to the substrate via stenciling. As objects exit from the station 14B, the conveyor section 16 may transport the objects to a station 14C for solder paste inspection (SPI) to inspect printer results, to a station 14D, 14E, and 14F for surface mount technology (SMT) component placement, to a station 14G for convection reflow oven to melt the solder to make electrical couplings, and finally to a station 14H for automated optical inspection (AOI) to inspect the object manufactured (e.g., the manufactured printed circuit board). After the objects proceed through the various stations, the objects may be removed from the station 14H, for example, for storage in a warehouse or for shipment. Clearly, for other applications, the particular system, machine components, machines, stations, and/or conveyors may be different or specially adapted to the application.

For example, the industrial automation system 10 may include machinery to perform various operations in a compressor station, an oil refinery, a batch operation for making food items, chemical processing operations, brewery operations, mining operations, a mechanized assembly line, and so forth. Accordingly, the industrial automation system 10 may include a variety of operational components, such as electric motors, valves, actuators, temperature elements, pressure sensors, or a myriad of machinery or devices used for manufacturing, processing, material handling, and other applications. The industrial automation system 10 may also include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like. In addition to the equipment described above, the industrial automation system 10 may also include motors, protection devices, switchgear, compressors, and the like. Each of these described operational components may correspond and/or generate a variety of OT data regarding operation, status, sensor data, operational modes, alarm conditions, or the like, that may be desirable to output for analysis with IT data from an IT network, for storage in an IT network, for analysis with expected operation set points (e.g., thresholds), or the like.

In certain embodiments, one or more properties of the industrial automation system 10 equipment, such as the stations 14, may be monitored and controlled by the industrial control system 12 for regulating control variables. For example, sensing devices (e.g., sensors 18) may monitor various properties of the industrial automation system 10 and may be used by the industrial control system 12 at least in part in adjusting operations of the industrial automation system 10 (e.g., as part of a control loop). In some cases, the industrial automation system 10 may be associated with devices used by other equipment. For instance, scanners, gauges, valves, flow meters, and the like, may be disposed on or within the industrial automation system 10. Here, the industrial control system 12 may receive data from the associated devices and use the data to perform their respective operations more efficiently. For example, a controller of the industrial automation system 10 associated with a motor drive may receive data regarding a temperature of a connected motor and may adjust operations of the motor drive based on the data.

The industrial control system 12 may be communicatively coupled to a display/operator interface 20 (e.g., a human-machine interface (HMI)) and to devices of the industrial automation system 10. Although one industrial control system 12 is depicted, it should be understood that any suitable number of industrial control systems 12 may be used in a particular industrial automation system 10 embodiment. The industrial control system 12 may facilitate representing components of the industrial automation system 10 through programming objects that may be instantiated and executed to provide simulated functionality similar or identical to the actual components, as well as visualization of the components, or both, on the display/operator interface 20. The programming objects may include code and/or instructions stored in the industrial control system 12 and executed by processing circuitry of the industrial control system 12. The processing circuitry may communicate with memory circuitry to permit the storage of the component visualizations.

As illustrated, the display/operator interface 20 depicts representations 22 of the components of the industrial automation system 10. The industrial control system 12 may use data transmitted by sensors 18 to update visualizations of the components via changing one or more statuses, states, and/or indications of current operations of the components. These sensors 18 may be any suitable device adapted to provide information regarding process conditions. Indeed, the sensors 18 may be used in a process loop (e.g., control loop) that may be monitored and controlled by the industrial control system 12. As such, a process loop may be activated based on process inputs (e.g., an input from the sensor 18) or direct input from a person via the display/operator interface 20. The person operating and/or monitoring the industrial automation system 10 may reference the display/operator interface 20 to determine various statuses, states, and/or current operations of the industrial automation system 10 and/or for a particular component. Furthermore, the person operating and/or monitoring the industrial automation system 10 may adjust to various components to start, stop, power-down, power-on, or otherwise adjust an operation of one or more components of the industrial automation system 10 through interactions with control panels or various input devices.

The industrial automation system 10 may be considered a data-rich environment with several processes and operations that each respectively generate a variety of data. For example, the industrial automation system 10 may be associated with material data (e.g., data corresponding to substrate or raw material properties or characteristics), parametric data (e.g., data corresponding to machine and/or station performance, such as during operation of the industrial automation system 10), test results data (e.g., data corresponding to various quality control tests performed on a final or intermediate product of the industrial automation system 10), or the like, that may be organized and sorted from OT data into IT data suitable for an enterprise computing system.

Sensors 18 may gather OT data indicative of one or more operations of the industrial automation system 10 or the industrial control system 12. In this way, the OT data may be analog data or digital data indicative of measurements, statuses, alarms, or the like associated with operation of the industrial automation system 10 or the industrial control system 12. In some cases, the OT data is mapped to specific, pre-programmed data storage locations (e.g., specific partition) in an enterprise computing system IT network. For example, OT data associated with a particular temperature sensor 18 is pre-routed to be saved in a database for related to a particular component (e.g., machine), location, temperature sensor manufacturer, measurements from the respective temperature sensor, and the like. In certain embodiments, the industrial automation system 10 may employ an OT/IT mapping system that may leverage microservices to automatically route OT data to data storage locations in the enterprise computing system IT network without following pre-determined data routings. For example, microservices may route OT data indiscriminately to other microservices, which may determine whether they subscribe to receive the particular data received via another microservice. In this example, since the OT data is not routed to any particular microservice, each respective microservice has an opportunity to analyze the OT data to determine whether it may process, analyze, characterize, or store the respective OT data.

In addition, the industrial control system 12 may receive IT data through communication with an OT/IT mapping system. The OT/IT mapping system may automatically route the IT data through various microservices to facilitate translating IT data into OT data, determining OT actions based on the IT data, and the like. IT data may also correspond to configuration data to change or to an adjustment of an operation of an OT machine within the OT network. In this way, IT data may sometimes be routed to a final storage location accessible by a corresponding controller to the OT machine that operates to enact the change. For example, IT data corresponding to a command to change a flow rate of a pump from a first level to a second level may be automatically routed by various microservices to be stored in a storage location accessible by the corresponding controller to the pump to perform the OT action. In this way, the OT/IT mapping system may determine a variety of OT actions and/or IT actions based on one or more IT datasets and/or OT datasets.

Figure 2:
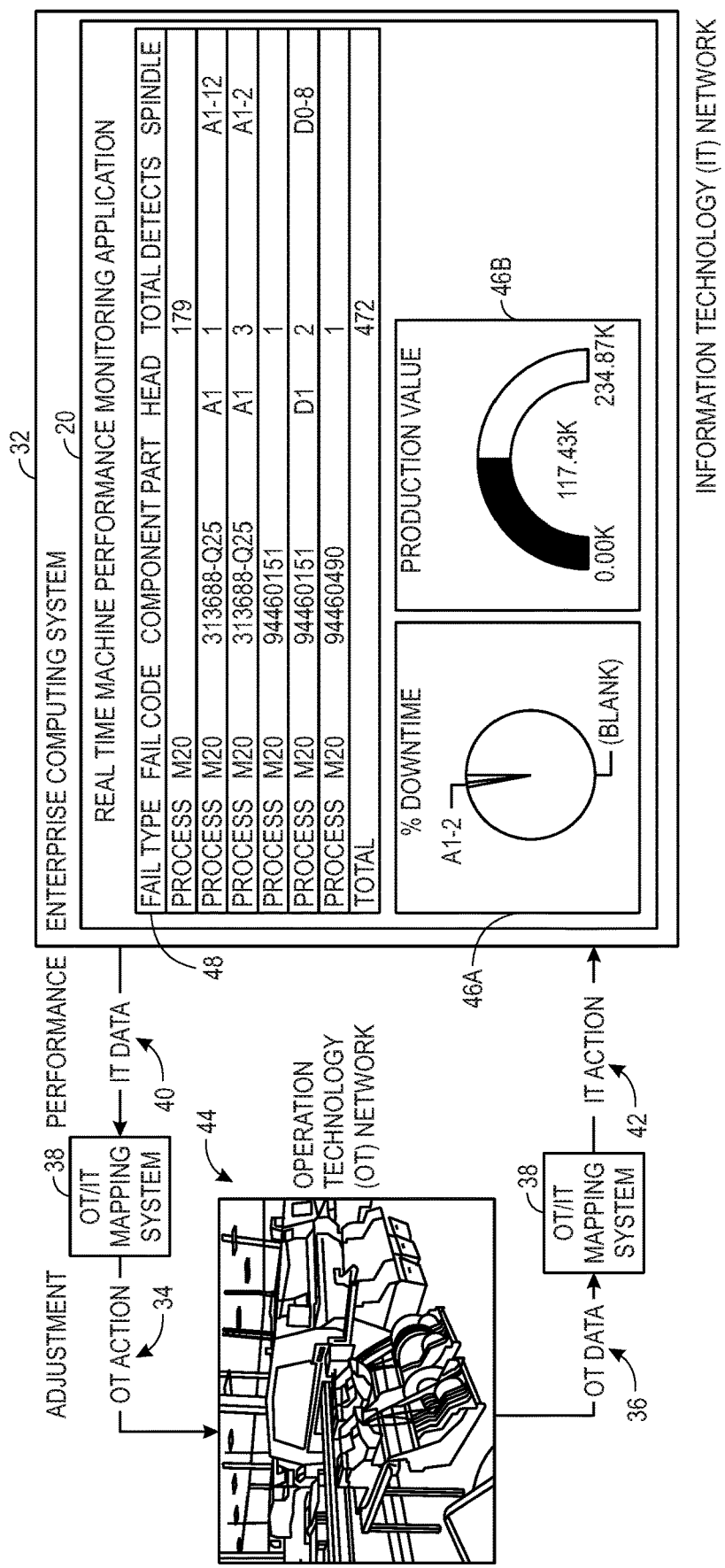
FIG. 2 is a block diagram of an example data flow of the industrial automation system of FIG. 1, in accordance with an embodiment.

To help elaborate, FIG. 2 is a block diagram of an example data flow of the industrial automation system 10 with an enterprise computing system 32. Although depicted as cyclical, as in the OT action 34 is generated in response to OT data 36, it should be appreciated that any suitable directions of data flow may proceed through the OT/IT mapping system 38. For example, IT data 40 may generate an IT action 42 or both IT data 40 and OT data 36 may be used to generate an OT action 34. Furthermore, it should be appreciated that data flow may proceed from the OT/IT mapping system 38 to any suitable layer of the enterprise computing system 32, such as between application layers, hardware layers, operating system layers, or the like. Although many suitable types of data may be classified as OT data 36 or IT data 40, the OT data 36 may include data or types of data associated with an OT network, such as one or more order numbers, one or more industrial facility identification numbers, one or more OT machine 44 identification numbers, operator information, date information, time information, one or more sensor measurements (e.g., pressure, temperature, voltage, current), one or more operating parameters, one or more scheduling operations, one or more power usages, or any combination thereof represented via one or more properties, such as a data tag, a data payload, a header, a data field or the like. Similarly, IT data 40 may include data or types of data associated with an IT network, such as configuration data, one or more input process adjustments to adjust operation of the OT machine 44, one or more maintenance schedules, one or more manufacturing events, one or more production schedules, one or more maintenance requests, one or more preventive maintenance requests, one or more customer complaint events, and the like represented via one or more properties, such as a data tag, a data payload, a header, a data field or the like.

As described earlier, OT machines 44 (e.g., station 14) generate OT data 36 (e.g., datasets collected from one or more components of the OT network). This OT data 36 may be generated through sensing or measurements by sensors 18. This OT data 36 transmits from the sensors 18 to an OT/IT mapping system 38 for analysis. Based on the analysis, the OT/IT mapping system 38 routes the OT data 36 to a suitable data location or component such as an IT action 42. The IT action 42 may be a command that facilitates routing the OT data 36 to a final destination, such as a command to save OT data 36 in a particular database. The IT action 42 may interact with devices, hardware, software, or the like of an IT network and may enable the OT data 36 to be used in various processes (e.g., performance monitoring, alarm monitoring, data analytics).

In addition, the IT action 42 may facilitate updating a real time machine performance monitoring application. The real time machine performance monitoring application may be presented by the enterprise computing system 24 on a display, such as a display/operator interface 20 (e.g., a HMI) or a graphical user interface (GUI), to provide a user with one or more indications of industrial automation system 10 performance through objects, such as graphs 46, data tables 48, or the like. The objections and/or the real time machine performance monitoring application may be updated in real time (e.g., within seconds or milliseconds) in response to changes in OT data 36 received from the OT machines 44 or the like. In this way, the IT action 42 may include instructions to generate an updated graphical user interface, or may include the updated graphical user interface, to update the real time machine performance monitoring application. Moreover, performance changes may manifest on the display 20 based on the final storage location of the OT data 36. For example, a particular memory location may automatically populate into a graph 46 or a data table 48, such that new datasets stored in the memory location are used to automatically update the graph 46 or the data table 48. In addition, the OT/IT mapping system 38 may update a graphical user interface presented to a user of the enterprise computing system 32 or other suitable IT device to display a determined OT action 34 or IT action 42, such that the user may verify the action before the action is executed.

The OT/IT mapping system 38 may also generate OT actions 34 based on the OT data 36, IT data 40, or both. This may occur, for example, if a dataset exceeds a threshold or other condition to prompt an adjustment to an operation of the OT machine 44. The OT actions 34 may be operational adjustments to the way or manner in which an OT machine 44 operates or is operated (e.g., by an on-premise device). In this way, an industrial automation system 10 may be controlled through outputted OT actions 34 generated by the OT/IT mapping system 30 in response to IT data 40, OT data 36, or both. The adjustments may be a combination of changes to electrical or mechanical parameters, including slowing or increasing a flow rate, closing a valve, increasing a speed at which a particular motor is operating at, powering down a component, powering on a component, or any suitable control operation performed to an OT machine 44 to change its operation. As described earlier, the OT/IT mapping system 38 may analyze received datasets using microservices to determine which combination of components to transmit the OT action 34 or the IT action 42. As may be appreciated, the OT network may include one or multiple of the OT machines 44, each performing a same or different task in the operation technology space, and the IT network may include one or more IT devices, such as the enterprise computing system 32, each coupled together in varying manners to facilitate individual device performance of a same or different task in the IT network.

Figure 3:
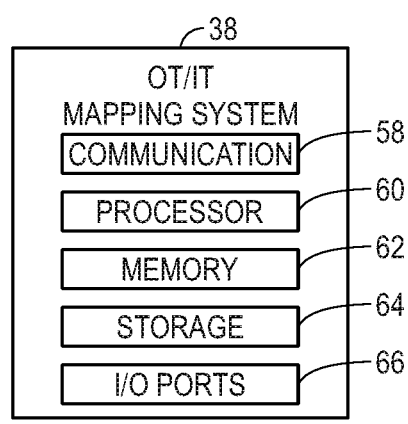
FIG. 3 is a block diagram of an example operation technology/information technology (OT/IT) mapping system, in accordance with an embodiment.

With the foregoing in mind, FIG. 3 is a block diagram of an example OT/IT mapping system 38. The OT/IT mapping system 38 may include a communication component 58, a processor 60, a memory 62, a storage 64, input/output (I/O) ports 66, and the like. The communication component 58 may be a wireless or wired communication component that facilitates communication between the enterprise computing system 32 and the OT/IT mapping system 38, or any other suitable electronic device. The processor 60 may be any type of computer processor or microprocessor capable of executing computer-executable code. The memory 62 and the storage 64 may be any suitable articles of manufacture that may serve as media to store processor-executable code, data, or the like. These articles of manufacture may represent computer-readable media (i.e., any suitable form of memory or storage) that may store the processor-executable code used by the processor 60 to perform the presently disclosed techniques, such as to perform IT actions 42, to generate IT data 40 for transmission to the OT/IT mapping system 38, or the like.

The I/O ports 66 may couple to one or more sensors 18, one or more input devices, one or more displays, or the like to facilitate human or machine interaction with the OT/IT mapping system 38. For example, based on a notification provided to a user via a display 20, the user may use an input device to instruct the adjustment of an OT machine 44. Although FIG. 3 is depicted with respect to the OT/IT mapping system 38, it should be noted that the industrial control system 12 and/or the enterprise computing system 32 may also include the same or similar components to perform, or facilitate performing, the various techniques described herein. In this way, the I/O ports 66 may couple to one or more sensors 18 to generate OT data 36, may couple to one or more actuating devices to perform the OT actions 34, or the like.

Figure 4:
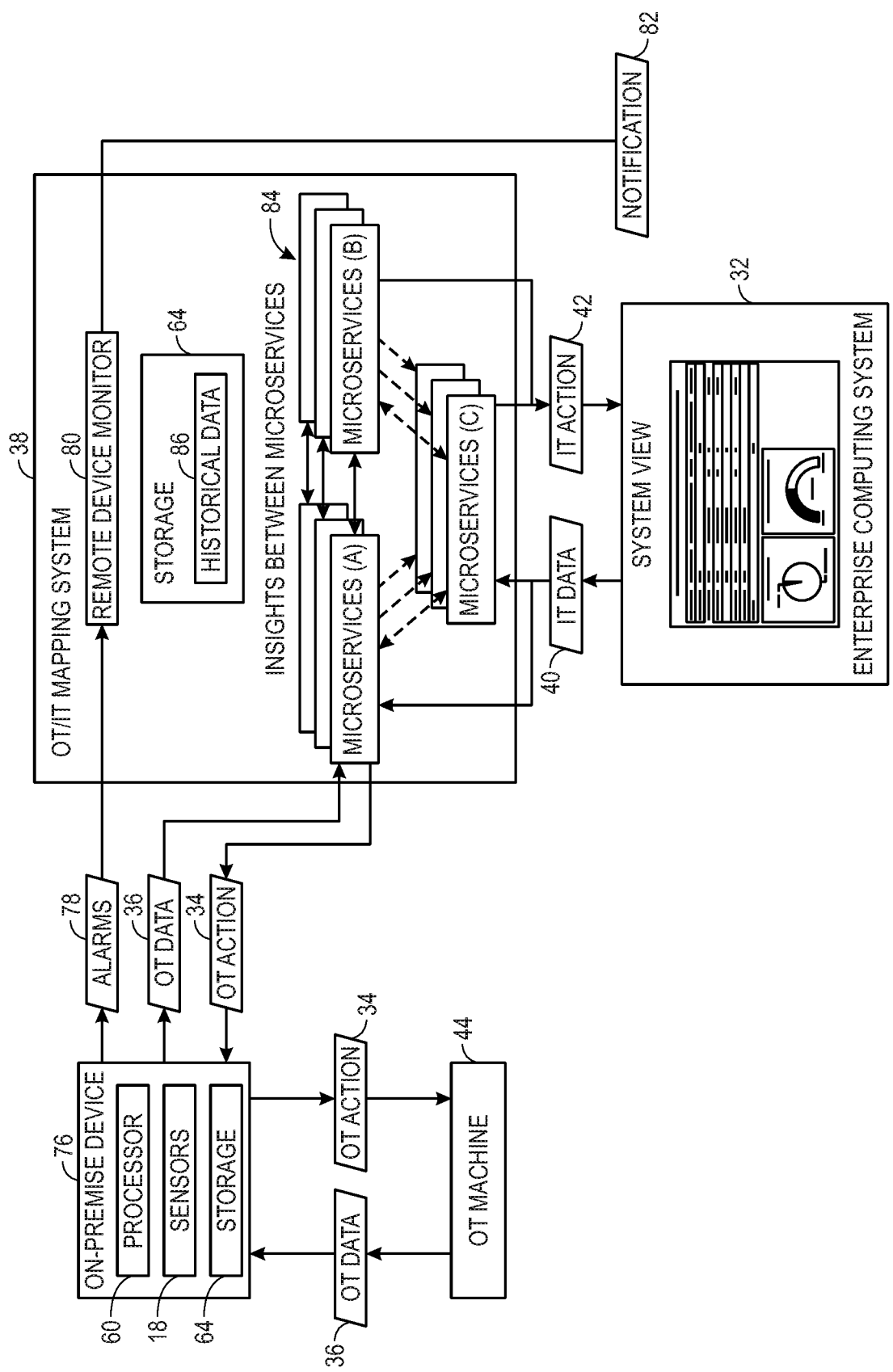
FIG. 4 is a block diagram of an OT/IT data system having the OT/IT mapping system of FIG. 3, an enterprise computing system, and an on-premise device operating with OT data, in accordance with an embodiment.

Referring now to FIG. 4, FIG. 4 is a block diagram illustrating operations between the OT/IT mapping system 38, the enterprise computing system 32, and the like. By way of example, the enterprise computing system 32 may receive an IT action 42 automatically determined from OT data 36 by the OT/IT mapping system 38. As depicted, an on-premise device 76, which may correspond to any suitable component in the OT network, may include a processor 60 (e.g., similar to the processor 60), one or more sensors 18, and a storage 64 (e.g., similar to the storage 64). The on-premise device 76 may be a drive, a motor, a controller (e.g., a programmable logic controller), a disconnect switch, or the like, and may include components, such as the sensors 18, to facilitate managing the operation of an associated component, such as one or more OT machines 44, of the industrial control system 12 and/or the industrial automation system 10.

For example, the on-premise device 76 may operate a valve open or closed in response to the OT actions 34. In this way, the sensors 18 may include a variety of I/O devices that receive any combination of status updates, commands, measured parameters, or control signals associated with a device being monitored. For example, the sensors 18 may include a temperature sensor, a voltage sensor, a pressure sensor, a state detector, or the like, or may be coupled to an output from a programmable logic controller, a valve, a drive, or the like, to sense one or more operational states of the device. The processor 60 may monitor one or more outputs of the sensors 18 for various alarm conditions, and, in response to a condition being satisfied (e.g., a measured output exceeding a threshold value), the processor 60 may initiate one or more alarms 78. In this way, the sensors 18 may be used for generating OT data 36 and may work with the processor 60 to generate alarms 78. The OT data 36 may be transmitted to the OT/IT mapping system 38, in addition to any alarms 78 generated by the processor 60.

After the OT/IT mapping system 38 receives the alarms 78 and OT data 36, the alarms 78 may be transmitted to a remote device monitor 80. The remote device monitor 80 may be any suitable component for remotely monitoring performance of an OT machine 44. In this way, the remote device monitor 80 may receive the alarms 78 from the on-premise device 76 and may generate notifications 82 in response to the alarms 78. These notifications 82 may be issued as pop-up messages, alerts, statuses, or the like, presented via a system view on the enterprise computing system 32. In some embodiments, the notification 82 may also cause triggering of an email, an alarm (e.g., an audible alarm), a pop-up window, or the like.

In some embodiments, the OT data 36 may be transmitted to a microservice 84. Through the interactions and conclusions drawn between the microservices 84, the OT/IT mapping system 38 may operate as actionable analytics loop that receives OT data 36 and/or IT data 40, and determines OT actions 34 and/or IT actions 42 to perform based at least in part on the received data. Conclusions drawn between datasets received over time (e.g., currently received datasets and historic data 86 or datasets) may also be used by the OT/IT mapping system 38 to determine OT actions 34 and/or IT actions 42 to perform.

In particular, in one embodiment, the OT/IT mapping system may include a number of the microservices 84 (e.g., programmed applications, consumers) that receive unclassified datasets from an IT network or an OT network. The microservices 84 may include analytical software that acts as a router and/or a subscription service. The microservices 84 may analyze the dataset to determine a category or classification for the dataset for use in the IT network or the OT network. For example, the microservices 84 may route the dataset to a final location based on the analysis, route the dataset to different programmed applications, segment the dataset for storage and use, or perform some other suitable operation on the dataset based on the determined category or classification. In this way, the microservices 84 may identify an IT device to transmit the OT data to based at least in part on an analysis of the OT data 36. The microservices 84 may include programming structures that provision an overall software application (e.g., overall mapping/routing application of the OT/IT mapping system) via a collection of the various configuration files (e.g., the microservice 84 configuration file defining an analytical function of the microservice 84). The microservices 84 may operate as a collection of generally coupled smaller software applications that when combined together perform the function of the overall software application.

By way of example, the microservices 84 may individually subscribe to a particular data delivery pipeline to receive OT data 36, IT data 40, or both. A data delivery pipeline may include one or more data delivery channels each connected to one or more microservices 84 and/or other data consumers. The data delivery pipeline may be include one or more data delivery channels, such that datasets may be piped or transmitted to different data consumers via different data delivery channels, where a microservice may identify a particular data channel based on one or more properties of the OT data 36, IT data 40, or both (e.g., data tag, data header, parsing results). In some cases, the data delivery pipeline may communicatively couple a first data consumer to a second data consumer, the second data consumer to a third data consumer, and so forth until reaching a last data consumer and, ultimately, a final data storage location. The OT/IT mapping system 38 may include one or more data delivery pipelines to facilitate dataset transmission throughout the microservices 84. In this way, datasets may transmit through data consumers that are relevant to the dataset and may not transmit through data consumers that are irrelevant to the dataset. For example, an IT data dataset related to maintenance actions may not transmit through a data consumer related to a total electrical power consumed analysis, unless the data consumer subscribes to receive the IT data dataset. In this architecture, subscribing microservices 84 of the data delivery pipeline may analyze the OT data 36 upon receipt and route the OT data 36 to another consumer (e.g., data consumer, other microservice, receiving program or device that analyzes or stores OT data) of the OT data 36, such as a final destination or another microservice 84. It should be noted that data delivery pipelines, while conduits to transmit data through, may facilitate parallel processing of different datasets. In this way, a first microservice of a first data delivery pipeline may be processing a first dataset at a similar (e.g., same) time as a second microservice of a second data delivery pipeline processes a second dataset.

Deploying OT/IT mapping system 38 as a collection of smaller software applications (e.g., microservices 84) may improve debugging techniques and modularity of the overall software application, thereby increasing the ease in which applications or functionalities may be edited (e.g., added, deleted, modified) within the overall software application. For example, using microservices 84 may make adding an additional analysis technique to the overall software application easier than adding the additional analysis technique through editing a larger, less modular (e.g., more comprehensive) program (e.g., code listing) associated with the overall software application as a whole. These microservices 84 may dynamically discover a relationship between the outputted dataset and a location in an IT network or OT network to store or map the dataset. In one embodiment, the microservice 84 may loosely couple the outputted data (e.g., OT data 36, IT data 40) to a location within the IT network or the OT network based on contexts associated with the outputted dataset discovered by the microservices 84 about the outputted dataset.

In addition, certain microservices 84 may generate insights or tangential information separate from the primary analysis functions performed by the respective microservice 84. The insights may be provided to different microservices 84 to perform other operations, and in this way, may sometimes be transmitted at a substantially similar time as the datasets between microservices 84 of a data delivery pipeline. The insights may also include information based on previously analyzed datasets or portions of datasets (e.g., OT data 36, IT data 40) and may be used to generate IT actions 42 or OT actions 34. The previously analyzed data may be stored in the IT network, such as in one or more IT devices like the enterprise computing system 32, or stored in the storage 64 as the historical data 86. In addition, insights may be shared between the microservices 84 based at least in part on parallel computations or parallel analysis, such that the result of a first analysis at a first microservice 84 may be shared as an insight for use in a second analysis at a second microservice 84, where the first and the second microservice may or may not be part of the same data delivery pipeline. Furthermore, one or more insights may be shared with the enterprise computing system 32, or any other IT device, such that the IT device may use the insights, received datasets, historical data, or the like in determining the IT data 40 to transmit to the OT/IT mapping system 38, or in determining actions as IT data 40 to transmit to the OT/IT mapping system 38 for conversion into OT actions 34 to change one or more operations of the OT machine 44. In addition, the actions as IT data 40 may be received by the microservices 84 and used to facilitate analysis of OT data 36 with respect to the action. Although not depicted as such, in some embodiments, the one or more IT devices associated with the enterprise computing system 32 may transmit IT actions to the OT/IT mapping system 38. IT actions originating from an IT device may be used in a similar manner as IT actions 42, including, however, instructing the OT/IT mapping system 38 to route the IT action to a different IT device. In this way, a status, alarm, operational change, or the like may be generated by a first IT device, transmitted to the OT/IT mapping system 38, and routed by the OT/IT mapping system 38 (after gleaning any insights and categorizing into a data delivery pipeline) into a final storage location, a second IT device, or the like. In some embodiments, an OT action 34 may be generated and transmitted by certain microservices 84, such that it may be routed to various microservices 84 until it reaches the corresponding OT machine 44 for implementation.

To dynamically determine where to route received OT data 36, a first receiving microservice 84 may receive the OT data 36 and determine or identify data tags that characterize the OT data 36. The microservice 84 may then determine whether any other microservice 84 or other consumer subscribes to data having the identified data tags through identification of a data delivery pipeline. If the microservice 84 identifies other microservices 84 or consumers subscribed to the identified data tags, the microservice 84 may route the OT data 36 through the data delivery pipeline to the subscribing microservice 84 or other consumers, such that the subscribing microservice 84 or consumer may perform some analysis on the OT data 36. The subscribing microservice 84 or consumer may analyze the received data and output the analyzed data, which may be routed to another microservice 84 or to another consumer. This process may continue until the OT data 36 or the output of each microservice 84 reaches a final target location in the IT network, such as a storage location based upon the analysis of the OT data 36 (e.g., classified OT data 36) or a repository that collects unclassified OT data 36, such as a storage location in the storage 64. In this way, the OT/IT mapping system 38 is not restricted to a point-to-point communication. Instead, the OT data 36 may be routed to different microservices 84 based on an identification or classification analysis performed by a microservice 84. In some embodiments, the OT data 36, newly generated data by a microservice 84, or other data may be routed to each microservice 84 until each respective microservice 84 has an opportunity to analyze the data.

The microservice 84 may guide or generate a definition of components of an industrial OT/IT architecture, determine functions and data associations between the IT network and the OT network, determine actionable workflows, determine relationships between OT and IT level functions, or the like. That is, certain microservices 84 may determine actionable workflows or commands at an industrial-level (e.g., specific to the particular industrial automation system 10), at an edge-level (e.g., OT/IT mapping system 38, router), or an enterprise-level (e.g., workflows or commands to be used across multiple industrial automation systems 10 communicatively coupled to an enterprise computing system 32). For example, the OT data 36 concerning the operational parameters or properties of an OT machine 44 may be routed to a microservice 84 that combines the OT data 36 with other OT data 36 and/or IT data 40 in an IT framework, which may be capable of processing the combined data to determine certain analyses to determine whether the OT machine 44 may operate more efficiently or in an otherwise improved manner. After determining the operational parameter adjustments for the OT machine 44, the respective microservice 84 may output a dataset that includes the adjustments into the network as an OT action 34, such that another microservice 84 (or the same microservice 84) may route the OT action 34 to the OT network and cause the OT machine 44 to implement the adjustment.

In certain embodiments, during design time (e.g., during initialization of machines in industrial automation system 10 prior to operating the machines), the OT/IT mapping system 38 may have access to a manifest that stores a logical name or equivalents of a data partition, of an identifier, of a data tag, of a desired data delivery pipeline (e.g., connection to microservice 84 or destination), and the like. Using the manifest, the OT/IT mapping system 38 may generate logical representations of the OT data 36 in a configuration mapping. The OT/IT mapping system 38 may then use the configuration mapping to select a physical connection between the producing microservice 84 and the consuming microservice 84.

During runtime (e.g., while the machines are performing their respective operations), each node (e.g., computer, gateway, router, cloud element, edge device, controller) of the OT or IT networks that communicates with the OT/IT mapping system 38 may include the manifest data describing how to process the logical associations between certain data types or datasets with certain data tags with respect to routing the data to a destination. In this way, a receiving microservice 84 may receive the OT data 36 and determine a logical association between the OT data 36 and another microservice 84, a partition in the node, other OT data 36 or IT data 40, or the like. For example, the microservice 84 may push or pull the OT data 36 through the OT/IT mapping system 38 to various microservices 84 to perform different analysis and/or routing operations until the OT data 36 is stored in a final partition or a particular final location. The process described above may be performed in parallel for multiple data packets (e.g., multiple datasets). In addition, in some embodiments, the OT data 36 and/or the IT data 40 may change directions during transmission through the OT/IT mapping system 38. As such, the OT/IT mapping system 38 may be considered a dynamic routing system that uses a condition of the OT data 36 or the IT data 40 or a result of an analysis of a respective microservice 84 to determine a next consumer to transmit the OT data 36 or the IT data 40 onto.

These described logical associations are considered insights. The insights may be shared between microservices 84, as the OT data 36 proceeds through the various microservices 84. Although not depicted, it should be understood that each microservice 84 may access historical data 86 stored in storage 64 of the OT/IT mapping system 38. In addition, each microservice 84 may output the IT data 40, the IT action 42, the OT action 34, the OT data 36, and the like based on the particular analytical or processing function of the microservice 84. The subsequent microservices 84 may interpret the output and route the output to a suitable final location or destination.

Figure 5:
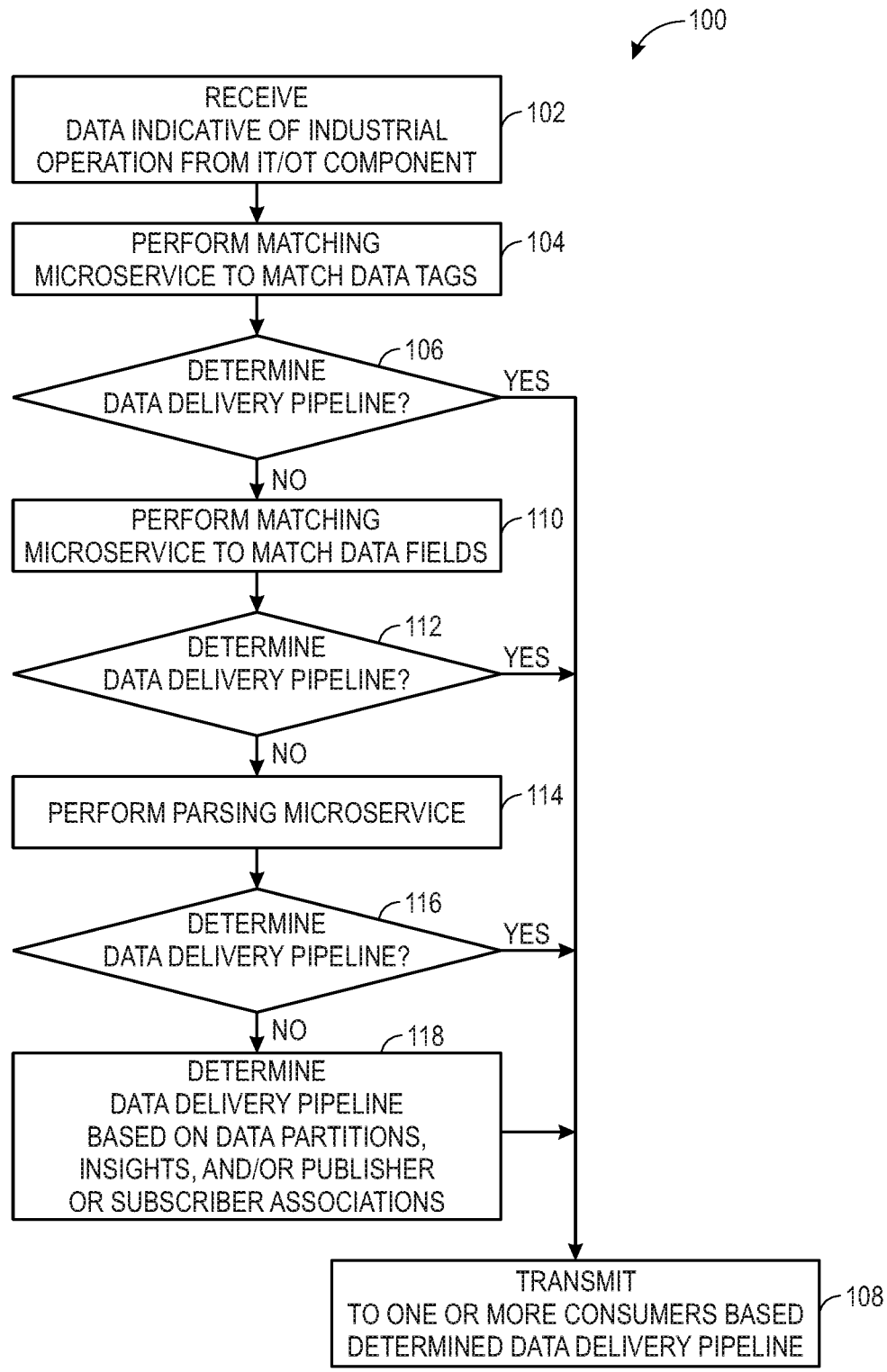
FIG. 5 is a flow chart of a method for determining a data delivery pipeline based on received OT data, in accordance with an embodiment.

To help describe the microservices 84, FIG. 5 is a flow chart of a method 100 for determining a data delivery pipeline via common data analytics based on received OT data 36 or IT data 40. Although the method 100 is described below as performed by the OT/IT mapping system 38, it should be noted that the method 100 may be performed by any suitable processor that uses microservices 84 to route OT data 36 or IT data 40 to a data delivery pipeline. Moreover, although the following description of the method 100 is described in a particular order, it should be noted that the method 100 may be performed in any suitable order.

At block 102, the OT/IT mapping system 38 may receive data indicative of an operation (e.g., operation data) from an IT component or an OT component. The data may be IT data 40 or OT data 36, depending on the source of the data. For example, if the data is generated by the OT machine 44, the OT/IT mapping system 38 may then receive the OT data 36 for routing. The OT/IT mapping system 38 may receive the OT data 36 or the IT data 40 through a variety of communication methods, including wireless or wired communication networks.

After receiving the operation data, at block 104, the OT/IT mapping system 38 may employ a matching microservice 84 to match data tags to data stored in data partitions. The matching microservice 84 may glean an initial classification from the data tag of the received OT data 36 or the received IT data 40. The data tag may be a header or otherwise appended digital signature associated with a source of the OT data 36 or the IT data 40. For example, the IT data 40 sourced from a same location may have the same data tag, or similar data tags, and thus may be initially classified or routed to other microservices 84 or other consumers based on these data tags.

At block 106, the OT/IT mapping system 38 may attempt to determine a data delivery pipeline based on the data tag determined at the block 104. The OT/IT mapping system 38 may process the OT data 36 or the IT data 40 to identify the data tag from the received data. After identifying the data tag, the OT/IT mapping system 38 may compare the data tag to a database or data partition of known data tags (e.g., predefined segmentation of datasets based on vendor information, location information, or the like), such as a service level agreement (SLA) driven data partition, to route the associated OT data 36 or the IT data 40 to a data delivery pipeline. It is noted that the OT/IT mapping system 38 may perform one or more analysis of the OT data 36 or the IT data 40 to determine the data delivery pipeline and, after selection of the data delivery pipeline, to determine consumers to transmit the OT data 36 or IT data 40 through based on subsequent analysis of the datasets. In this way, the transmission path of the OT data 36 or the IT data 40 through the OT/IT mapping system 38 may be determined at least in part by a determined condition and/or an analysis of the datasets as it is changed through respective transmissions into and out of each data consumer (e.g., such as the microservice 84). As described herein, the OT/IT mapping system 38 may dynamically determine the transmission path from a first destination to a final destination rather than using a one-to-one association predefined for reference by the OT/IT mapping system.

In response to the OT/IT mapping system 38 determining the data delivery pipeline for the OT data 36 or the IT data 40, at block 108, the OT/IT mapping system 38 may transmit the OT data 36 or the IT data 40 to one or more data consumers based at least in part on the determined data delivery pipeline. The data consumers may be any microservice 84, data-consuming software, data-consuming application, data storage location, or the like that may process the received data to determine new data, actions for other devices, or the like. The data consumers may include those applications that subscribe to a particular classification of data corresponding to the determined data delivery pipeline. In this way, the OT/IT mapping system 38 may perform a semantic routing. To perform the semantic routing, the OT/IT mapping system 38 may determine a first data delivery pipeline in response to a first data tag and may determine a second data delivery pipeline in response to a second, different data tag, where the first data delivery pipeline may be different or similar to the second data delivery pipeline (e.g., where different consumers may or may not subscribe to each data delivery pipeline). In addition, the data consumers may include applications or microservices 84 that have not previously received the OT data 36 or the IT data 40.

If the OT/IT mapping system 38 does not determine an appropriate data delivery pipeline, the OT/IT mapping system 38 may proceed to block 110. At block 110, the OT/IT mapping system 38 may operate the data tag matching microservice 84 to transmit the OT data 36 or the IT data 40 to a second matching microservice 84. The second matching microservice 84 may analyze the OT data 36 or the IT data 40 in an attempt to match data fields to a corresponding data delivery pipeline. The data fields may include fields such as title, time records, location recorded, and so forth. The data fields may be configurable fields associated with equipment of the OT network or the IT network, and may serve to further define the OT data 36 or the IT data 40. In this way, the data field may supplement conclusions made about the OT data 36 or the IT data 40 by the microservice 84 based on the data tag.

After analyzing the data field, at block 112, the OT/IT mapping system 38 via the second matching microservice 84 may try to determine the data delivery pipeline based at least in part on the data tag and the data field. The matching that the second microservice 84 performs at block 112 may be similar to the matching that occurs at the block 106. In this way, the data field and the data tag information determined by the second microservice 84 may be compared against data fields and data tag information saved within data partitions. If the OT/IT mapping system 38 (e.g., second microservice 84) is able to match the data field and/or the data tag to a data delivery pipeline, the OT/IT mapping system 38 may proceed to block 108 and transmit the OT data 36 or the IT data 40 to the corresponding data delivery pipeline for subsequent transmission to appropriate data consumers.

However, if the OT/IT mapping system 38 does not determine the data delivery pipeline at block 112, at block 114, the OT/IT mapping system 38 may transmit the OT data 36 or the IT data 40 to a parsing microservice 84 to further analyze the content of the OT data 36 or the IT data 40. The parsing microservice 84 may operate to analyze the actual sensor data or measured indications associated with the OT data 36 or the IT data 40. As such, the parsing microservice 84 may break down or identify one or more components that make up the OT data 36 or the IT data 40. The parsing operation is interested in the data content and the data headers. In particular, for routing purposes, this data header may convey associative rules that facilitate routing of OT data 36 or the IT data 40 after the particular dataset achieves one or more states after transformation. If the OT data 36 or the IT data 40 fulfills a condition of one or more of the associative rules, a corresponding data header identification may be associated with the OT data 36 or the IT data 40 to facilitate offering of the dataset by the OT/IT mapping system 38 for consumption to one or more matching subscribers. As such, the parsing microservice 84 may parse these values and compare the values to expected inputs, or relative inputs, to glean insight to the origins of the OT data 36 or the IT data 40.

After parsing the dataset, at block 116, the OT/IT mapping system 38 via the parsing microservice 84 may try to determine a data delivery pipeline based at least in part on the parsing results (e.g., within which one or more potential states of the OT data 36 or the IT data 40 are mapped to a consumption identifier associated with the one or more matching subscribers), the data tag, and the data field. If the OT/IT mapping system 38 is able to match the dataset to the data delivery pipeline, the OT/IT mapping system 38 may proceed to block 108 and cause the parsing microservice 84 to transmit the OT data 36 or the IT data 40 to the corresponding data delivery pipeline for subsequent transmission to data consumers.

If the OT/IT mapping system 38 is not able to match the dataset to a data delivery pipeline at block 116, the OT/IT mapping system 38 proceed to block 118 and may use another microservice 84 to analyze the parsing results, the data tag, the data field in light of data partitions, insights, publisher and subscriber relationships, and the like to try to best categorize all or some of the received dataset into one or more data delivery pipelines for analysis or storage. The OT/IT mapping system 38 may use associations from a data pipeline registry to determine the data delivery pipeline for the particular dataset. In some embodiments, when the OT/IT mapping system 38 is unable to determine a data delivery pipeline to transmit the dataset, the OT/IT mapping system 38 transmits the OT data 36 or the IT data 40 through a default data delivery pipeline that may route to a backup or expected location specially designed to analyze or store datasets unable to be sorted into a different data delivery pipeline. For example, the dataset may be transmitted through the default data delivery pipeline for storage in a repository designed to store unsegmented or uncharacterized datasets.

In some embodiments, the OT/IT mapping system 38 may identify other microservices 84 that have not yet received the OT data 36 or the IT data 40. In any case, the OT/IT mapping system 38 may determine a data delivery pipeline to transmit the dataset based on the microservices 84 that have not received the respective data or based on the determination at block 118. As such, the OT/IT mapping system 38 may proceed to block 108 and transmit the OT data 36 or the IT data 40 to one or more data consumers based on the determined data delivery pipeline. As mentioned above, these data consumers may subscribe to the type of data represented by the OT data 36 or the IT data 40 determined by the OT/IT mapping system or may be identified as data consumers that may use or analyze the respective dataset. Upon receiving the dataset, the data consumer (e.g., one or more microservices 84) may analyze or store the dataset, according to the particular function the respective data consumer performs. It should be noted that the OT/IT mapping system 38 may be programmed to transmit some or all of each received dataset and that each of the microservices 84 may perform data segmentation and/or an analytical function based on a variety of conditions defined within the configuration file of the microservice 84.

Figure 6:
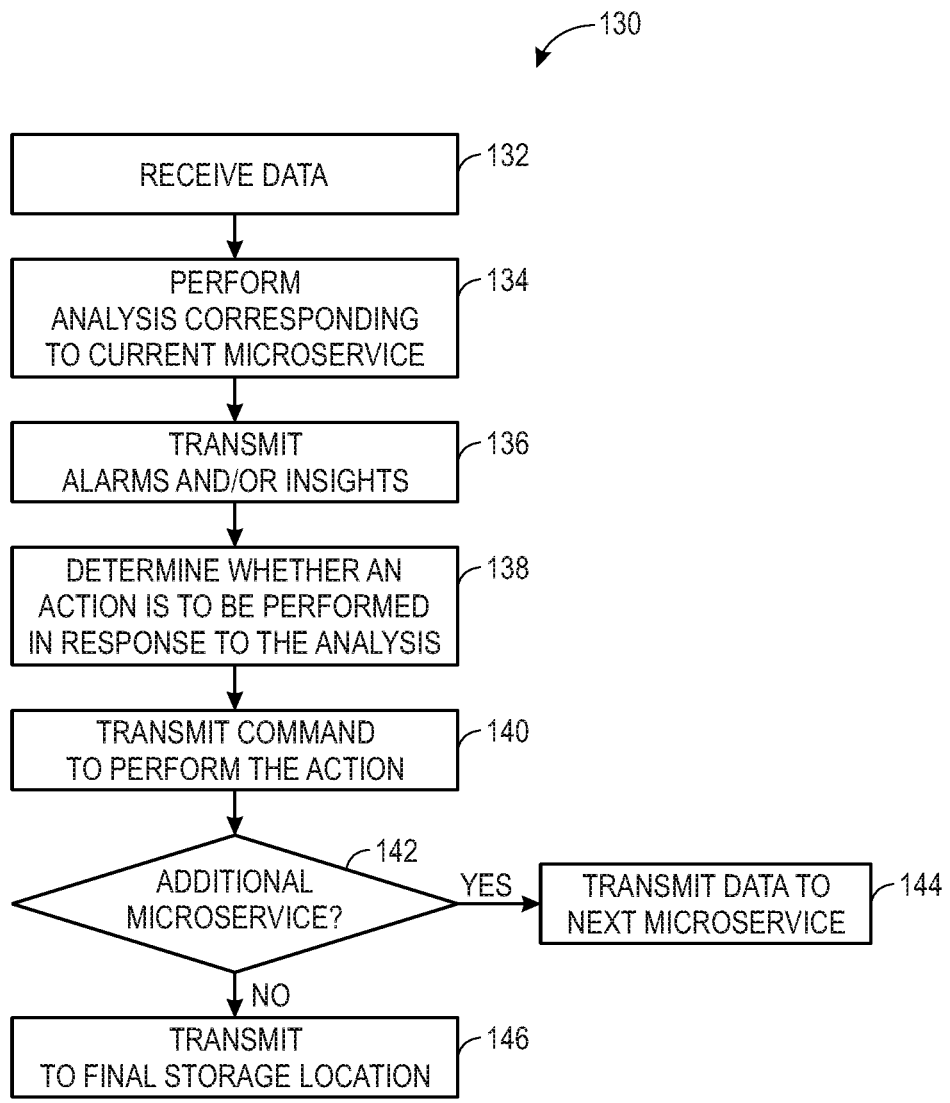
FIG. 6 is a flow chart of a method for analyzing the received OT data of FIG. 5 via the determined data delivery pipeline, in accordance with an embodiment.

FIG. 6 is a flow chart of a method 130 for analyzing the received OT data 36 or IT data 40 via the determined data delivery pipeline (e.g., determined through the common data analytics of method 100). Although the method 130 is described below as performed by the OT/IT mapping system 38 it should be noted that the method 130 may be performed by any suitable processor that uses microservices 84 to route OT data 36 or IT data 40 into a data delivery pipeline communicatively coupled to one or more consumers or subscribers. Moreover, although the following description of the method 130 is described in a particular order, it should be noted that the method 130 may be performed in any suitable order.

After the OT/IT mapping system 38 transmits the dataset through the data delivery pipeline, at block 132, a subscribing microservice 84 of the OT/IT mapping system 38 receives the OT data 36 or IT data 40. This data may be indicative of a variety of industrial operations or properties, such as operation configurations (e.g., settings), data indicative of manufacturing events (e.g., equipment malfunction, process down-time), production quality data, or the like.

At block 134, the subscribing microservice 84 may perform a particular type of analysis. As mentioned above, the OT/IT mapping system 38 may have a variety of microservices 84 programmed to perform different analysis. Each analysis may generate one or more insights into or about the data. Examples of analysis include matching data events (e.g., minimum, maximums, abnormal data points) with data events of other datasets (e.g., corresponding to other equipment or aspects of OT machine operation, such as matching local maximums or minimums), performing various regressions to predict or determine performances (e.g., linear regression), comparing values to set points to suggest or change operations, or the like.

After performing the corresponding analysis to the microservice 84, at block 136, the microservice 84 may transmit any generated alarms 78, insights, patterns, or other results related to the analysis of the received data to suitable other components of the OT/IT mapping system 38, the enterprise computing system 32, the industrial automation system 10, the industrial control system 12, the IT network, the OT network, or the like. For example, after analyzing the datasets, the microservice 84 may determine that an OT machine 44 is operating abnormally, thus in response to this determination, the microservice 84 may transmit an alarm 78 to a display/operator interface 20 of the enterprise computing system 32, the industrial control system 12 to request operator intervention, or the like. In addition, the microservice 84 may determine a particular insight about the data and may transmit the insight to the other microservices 84 subscribed to the data delivery pipeline associated with the OT data 36 or IT data 40 received. In this way, the other microservices 84 may leverage the conclusions made by the microservice 84 in the corresponding analysis to the other microservices 84.

At block 138, the microservice 84 may determine an action is to be performed in response to the analysis performed at the block 134. The microservice 84 may determine the action based on conclusions drawn by itself or by other microservices 84 based on the OT data 36, the IT data 40, historical data 86, insights transmitted between microservices 84, or the like. The action may be the OT action 34 or the IT action 42 used to modify operation of one or more components in the IT network, OT network, or both. These actions may also be used to change production operations, repair schedules, or the like. For example, in response to the OT/IT mapping system 38 via the microservice 84 determining that an OT machine 44 is malfunctioning, the microservice 84 may transmit an IT action 42 to schedule maintenance on the malfunctioning OT machine 44 or may adjust production schedules or timelines to account for the change in the operation of the OT machine 44.

In response to determining an action is to be performed, at block 140, the microservice 84 of the OT/IT mapping system 38 may transmit a command (e.g., instruction) to perform the action. The microservice 84 may transmit the OT action 34 if the action to be performed is to change the operation of one or more OT machines 44. However, the microservice 84 may transmit the IT action 42 if the action to be performed is to change to operation of one or more IT network devices or systems. For example, the IT action 42 may include a command to change the enterprise computing system 32, data stored in the IT network, production schedules maintained via the IT network, maintenance schedules maintained via the IT network, or the like.

At block 142, the OT/IT mapping system 38 may determine whether an additional microservice 84 subscribing to the output from the current microservice 84 exists in the OT/IT mapping system 38. The microservices 84 of the OT/IT mapping system 38 may be interconnected, such that a first microservice 84 may pass any amount of the OT data 36, the IT data 40, insights, the OT actions 34, the IT actions 42, the alarms 78, or the like, to any subsequent, previous, or otherwise interconnected microservice 84. In this way, one or more additional microservices 84 may be communicatively coupled downstream of the current microservice 84 responsible for performing the analysis at block 134. In some embodiments, the OT/IT mapping system 38 may determine whether each of the microservices 84 hosted by the OT/IT mapping system 38 has received the respective dataset to perform its own respective analysis.

In response to the OT/IT mapping system 38 determining that an additional microservice 84 exists, at block 144, the current microservice 84 may transmit the OT data 36 or IT data 40 to the downstream microservice 84 for further analysis. However, in response to the OT/IT mapping system 38 not determining that an additional microservice 84 exists, at block 146, the current microservice 84 transmits the OT data 36 or the IT data 40 to a final storage location. The final storage location may be specific to the data delivery pipeline associated with the current microservice 84. However, the final storage location may also be a common or default storage location to collect the OT data 36 and IT data 40 into a single location. In some embodiments, the OT/IT mapping system 38 causes the OT data 36 or the IT data 40 to be transmitted back to various microservices 84 for additional analysis or to different consumers before transmission to a final storage location. This final storage location may accessible via routing to a cloud computing network associated with the IT network or an enterprise computing system 32 of the IT network.

Figure 7:
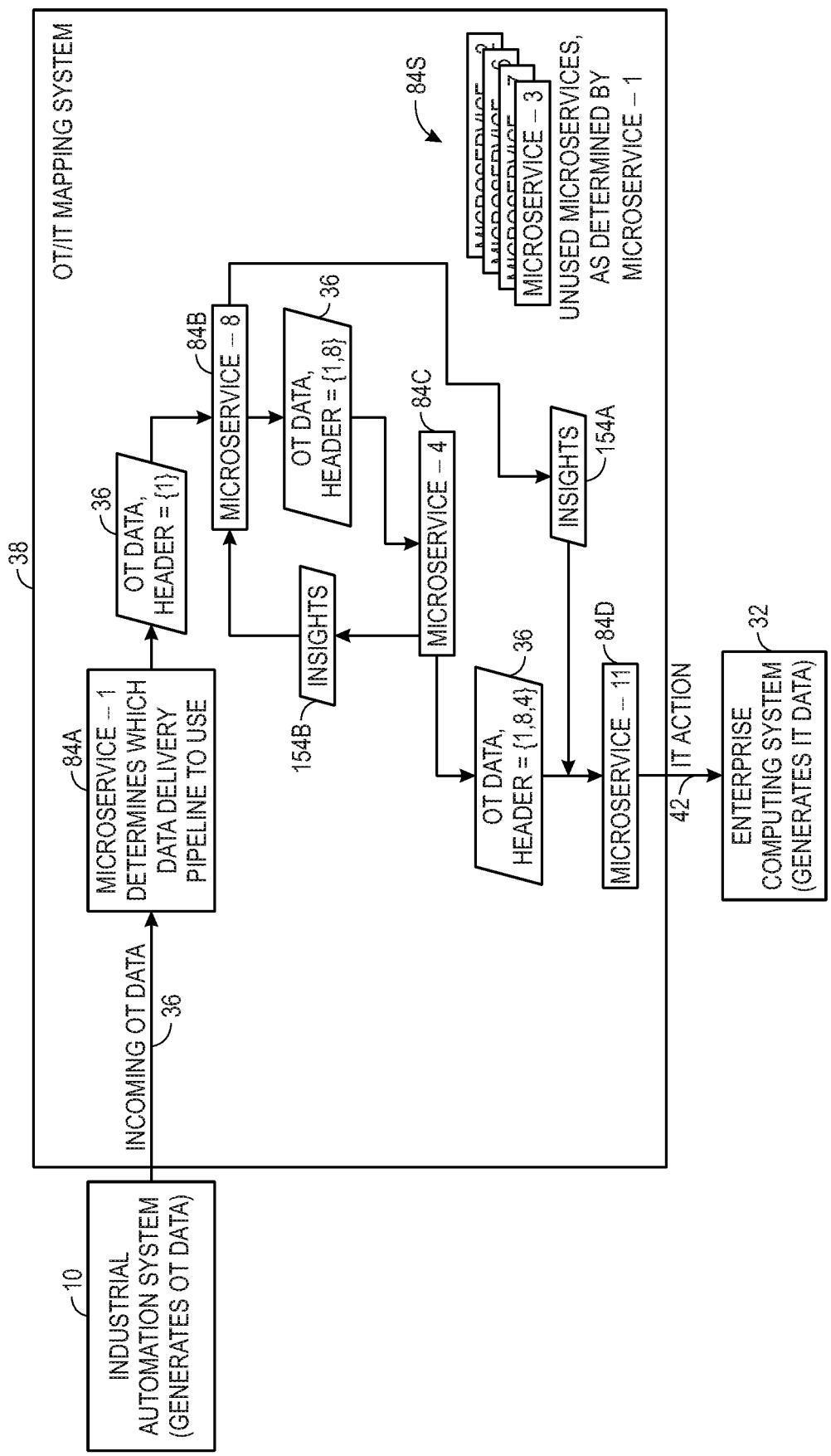
FIG. 7 is a block diagram of an example OT data flow through an OT/IT mapping system, in accordance with an embodiment.

To elaborate further on the communicative couplings between microservices 84, FIG. 7 is a block diagram of an example flow of the OT data 36 through an OT/IT mapping system 38. As depicted, the OT data 36 is received by the OT/IT mapping system 38. The incoming OT data 36 is transmitted to a first micro service 84A that may include multiple microservices 84, sometimes referred to as sub-microservices, to segment the OT data 36 to various data delivery pipelines based on data tags, data fields, and data payload (e.g., parsing of sensed data) to dynamically route portions of the OT data 36 to one or more data delivery pipelines as the OT data 36 is received by the OT/IT mapping system 38. By way of operation, the first microservice 84A may select a data delivery pipeline that changes which subset of microservices 84 or consumers the OT data 36 is to be transmitted through before final storage. As depicted, the first microservice 84A has selected a data delivery pipeline that includes three microservices 84B-D and excludes a subset of microservices 84S. A portion of the OT data 36 is then transmitted to a second microservice 84B. Before or after reaching the second microservice 84B, the OT data 36 may have an associated data header changed (e.g., updated) to include an indication of the microservices 84 that has previously received the respective dataset. Thus, the OT data 36 is updated to indicate that it has been transmitted to the first microservice 84A (e.g., Header=[1]).

At the second microservice 84B, the OT data 36 is processed and analyzed. During the processing of the OT data 36, the second microservice 84B generates an insight 154A that is transmitted to a third microservice 84C to be used in an additional analysis. The OT data 36 is transmitted from the second microservice 84B to the third microservice 84C and the header is updated to show that the OT data 36 was previously received by the second microservice 84B (e.g., Header=[1, 8]). After analysis is performed by the third microservice 84C, the OT data 36 may be transmitted to the fourth microservice 84D and one or more insights 154B may be transmitted back to the second microservice 84B or the first microservice 84A (not shown) to cause new data generated from a respective microservice 84 to be received by other microservices 84 to perform its respective analysis on the newly generated data. After the microservice 84C receives the OT data 36, the header of the OT data 36 is updated to include an indication of the third microservice 84C (e.g., Header=[1, 8, 4]). The fourth microservice 84D may determine an IT action 42 in response to the OT data 36 and the insights 154A from the second microservice 84B.

This IT action 42 may indicate a change to the enterprise computing system 32, such as a change in production scheduling based on the OT data 36.

Although depicted as progressing generally sequential through the determined data delivery pipeline and subscribing microservices 84, it should be understood that a received dataset may transmit in any suitable order and direction until analyzed by each microservice 84 or received by each consumer associated with the determined data delivery pipeline. For example, the IT data 40 may be provided to the OT/IT mapping system 38 and received by each microservice 84 described above. The OT/IT mapping system 38 may track where the dataset has been through indications in the data header, as described above, and/or through any suitable flag or data appended or included in the dataset, such as data included in a data payload of the dataset. In this way, the microservices 84 may transmit the dataset to and from other microservices 84 until each subscribing microservice 84 has a chance to analyze the dataset. The information related to which microservices 84 are subscribed to which data delivery pipeline, may be included in a subscriber/publisher database accessible by the OT/IT mapping system 38 and/or the respective microservices 84. Context associated with the datasets may facilitate defining transmission paths of the dataset through the various consumers. In addition, as briefly described above, the data header of the OT data 36 or the IT data 40 may be considered a data store that includes the indication of consumers the dataset has passed through and/or undergone analysis, and in some embodiments, an association rule holder. For example, if a particular OT data 36 or IT data 40 dataset is to be transformed and if the association rule conditions are met (e.g., as defined in respective data headers of the OT data 36 or the IT data 40), the routing of the dataset may change accordingly. Thus, the association rules defining the association rule conditions facilitate determining the data delivery pipelines of data consumers.

One example implementation includes a system for an enterprise-level data correction loop that leverages the OT/IT mapping system 38. Manufacturing data may be received by the OT/IT mapping system 38 as the OT data 36. Microservices 84 of the OT/IT mapping system 38 may analyze the OT data 36 and determine transactional actions or trends in response to the OT data 36. In this way, the OT data 36 received may include indications of order numbers, industrial facility identification numbers, OT machine 44 identification numbers, operator information, date information, time information, and the like. Based on this data, the OT data 36 may be segmented into various data pipelines for additional analysis and storage. The OT/IT mapping system 38 may use the information included in the OT data 36 to segment and classify the data to correspond to a particular component and manufacturing process, and to a specific product number. In this way, performance of a product or device associated with the specific product number may be linked from the IT network side to the original OT data 36 automatically. Thus, if the manufactured product malfunctions, or receives a complaint, or the like, the performance and manufacturing history associated with the manufactured product may be easily linked to the specific product number itself and recalled for analysis.

As described above, the OT data 36 may be transmitted to an IT network for storage. In some embodiments, this OT data 36 may be translated into a common data format prior to transmission for storage. For example, the OT data 36 may be transmitted from the OT/IT mapping system 38 as an Extensible Markup Language (XML) file, JavaScript Object Notation (JSON) file, or a suitable file type for interpretation by network devices of the IT network.

In addition, in some embodiments, the OT/IT mapping system 38 may facilitate changing of various sensors 18, OT machines 44, or other suitable components of the OT network. The OT/IT mapping system 38 may enable a change in a publishing device (e.g., a device that generates OT data 36 or IT data 40) without having to make reroutings, like may be done in a point-to-point mapping system. Since the OT/IT mapping system 38 dynamically routes dataset via segmentation and classification of datasets for transmission via data delivery pipeline, a new data delivery pipeline may be defined in response to changing a publishing device (e.g., adding a new type of device) but not a direct point-to-point link (e.g., communication or reporting link) between the specific publishing device and a specific storage location.

In certain embodiments, the microservice 84 may guide or generate the definition of primary components of an industrial OT/IT architecture, determine functions and data associations between the OT network and the IT network, determine actionable workflows, and determine relationships between OT level and IT level functions. That is, certain microservices 84 may determine actionable workflows or commands for use at an industrial-level, at an edge-level, or at an enterprise-level. In addition, these determinations, in some embodiments, may also apply to various enterprise computing system 32 levels, such as an application level, software level, operating system level, session level, transport level, or the like, such that the IT action 44 may be routed to any suitable location in the IT network. By using the microservices 84 at various levels in the industrial (e.g., OT network) environments or enterprise (e.g., IT network) environments, actionable commands may be performed by various microservices 84, devices in the industrial environment (e.g., OT machines 44), devices in the enterprise environment (e.g., enterprise computing system 32), or the like based on the respective analysis performed by the respective microservices 84.

In addition, the OT/IT mapping system 38 may include components to map couplings between the OT network and the IT network during runtime data acquisition operations and may not be pre-defined by a user. That is, instead of performing a pre-defined point-to-point mapping of one set of data from a first network into another set of data of a second network, the OT/IT mapping system 38 may dynamically map data from the first network to a dataset in the second network during runtime.

Technical effects of the present disclosure include techniques for operating an industrial automation system through automatic routing and classification of received OT data and/or IT data. An OT/IT mapping system designed for industrial applications may receive OT datasets or IT datasets. Based upon the received datasets, the OT/IT mapping system uses one or more microservices to segment and classify the OT datasets or IT datasets into one or more data delivery pipelines. Microservices may subscribe to the different data delivery pipelines and may be leveraged to analyze the OT data or the IT data upon receiving the data via the data delivery pipeline. In some embodiments, a microservice may include one or more additional microservices to perform an overall analysis. Microservices may transmit data and insights between each other to perform more effective analysis and routing. In this way, the OT/IT mapping system may facilitate the automatic routing, segmenting, and classification of OT data and IT data without using predefined point-to-point data logging techniques currently used in industrial automation systems (e.g., where at installation, an operator defines which final storage location which recorded data is to be saved to at receipt into an IT network).

While only certain features of the presently disclosed embodiments have been illustrated and described herein, many modifications and changes will occur to those skilled in the art. It is, therefore, to be understood that the appended claims are intended to cover all such modifications and changes as fall within the true spirit of the embodiments described herein.

The invention claimed is:

1. A system, comprising:
a data delivery pipeline communicatively coupled to one or more microservices configured to receive a dataset transmitted through the data delivery pipeline;
a first microservice configured to:
receive a first dataset corresponding to operation technology (OT) data or information technology (IT) data, wherein the first dataset comprises a first property indicating previous routing of the OT or IT data; and
generate a second dataset using the first dataset, wherein the second dataset comprises a second property, wherein the second property is generated by updating the first property to indicate that the OT or IT data has been transmitted to the first microservice; and
the second microservice configured to:
receive the second dataset from the first microservice via the data delivery pipeline;
update the second property to indicate that the OT or IT data has been transmitted to the second microservice;
determine an action to perform in an industrial automation component of an industrial automation system based on an analysis of the second dataset; and
transmit the action to the industrial automation component via the data delivery pipeline.

2. The system of claim 1, wherein the first microservice is configured to transmit the first dataset according to a respective data delivery channel of a plurality of data delivery channels in the data delivery pipeline to the second microservice.

3. The system of claim 1, wherein the first microservice is configured to:
wherein the second dataset comprises tangential information separate from primary analysis functions performed by the second microservice; and
transmit the first dataset and the second dataset to the second microservice, wherein the second microservice uses the second dataset for analyzing the first dataset.

4. The system of claim 1, wherein the data delivery pipeline is one of a plurality of data delivery pipelines, wherein the data delivery pipeline is selected based at least in part on an initial classification of the first dataset.

5. The system of claim 1, wherein the OT data comprises an order number, an industrial facility identification number, an OT machine identification number, an operator information, a date information, a time information, a sensor measurement, a data tag, a data payload, a header, a data field, or any combination thereof.

6. The system of claim 1, wherein the IT data comprises configuration data, process adjustments, a data tag, a data payload, a header, a data field, a maintenance schedule, a manufacturing event, a production schedule, a maintenance request, customer complaint event, or any combination thereof.

7. The system of claim 1, wherein the first microservice determines the action based at least in part on an interaction between the first dataset and the second dataset as part of an actionable analytics loop configured to adjust operation of the industrial automation component in response to the action.

8. The system of claim 1, wherein the data delivery pipeline is configured to transmit the first dataset for processing via the second microservice parallel to an additional data delivery pipeline processing an additional dataset via a third microservice.

9. The system of claim 1, wherein each respective microservice of the one or more microservices is configured to perform a respective analytical function according to a respective configuration file.

10. The system of claim 1, wherein the first property and the second property comprise one or more of data headers, data tags, data flags, and data payloads.

11. A method, comprising:
receiving operation technology (OT) data at a first microservice from an industrial automation component of an industrial automation system;
transmitting the OT data to an information technology (IT) device, wherein the first microservice is configured to identify the IT device based at least in part on a first analysis of the OT data, wherein the first analysis of the OT data comprises determining whether one or more data tags of the OT data matches one or more data tags associated with the IT device, wherein the one or more data tags of the OT data are associated with one or more sources of the OT data;
receiving an action from the IT device; and
sending the action to the industrial automation component, wherein the industrial automation component is configured to adjust one or more operations based on the action.

12. The method of claim 11, comprising analyzing the OT data to determine a data delivery pipeline to transmit the OT data to the IT device.

13. The method of claim 11, comprises determining tangential information separate from the first analysis of the OT data performed by the first microservice.

14. The method of claim 11, comprising transmitting the action to one or more microservices configured to analyze the OT data with respect to the action.

15. A method, comprising:
receiving information technology (IT) data at a first microservice from an IT device communicatively coupled to one or more IT components within an IT network;
transmitting the IT data to a second microservice through a data delivery pipeline, wherein the data delivery pipeline is identified by the first microservice based on whether one or more properties of the IT data matches one or more properties of the data delivery pipeline;
determining, at the second microservice, an action for an industrial automation device of an industrial automation system based on the IT data; and
transmitting, via the second microservice, the action to the industrial automation device, wherein the action is configured to cause the industrial automation device to adjust one or more operations.

16. The method of claim 15, wherein the action comprises a change to one or more electrical parameters, one or more mechanical parameters, a decreasing operation, an increasing operation, a closing operation, an opening operation, a powering down operation, a powering on operation, or any combination thereof.

17. The method of claim 15, wherein the one or more properties of the IT data comprises a data tag of the IT data, a data field of the IT data, or both.

18. The method of claim 15, comprising:
   determining, via the second microservice, an additional action associated with the IT device based on the IT data; and
   transmitting the additional action to the IT device.

19. The method of claim 18, comprising updating a first graphical user interface to display the action for a user to verify.

20. The method of claim 15, comprising mapping the IT data from the IT network to a dataset in an OT network comprising the industrial automation device during runtime of the industrial automation device.

* * * * *